Oct. 3, 1944.  A. M. KATZ  2,359,425
DOLL CONSTRUCTION
Filed Jan. 8, 1942
FIG. 1.
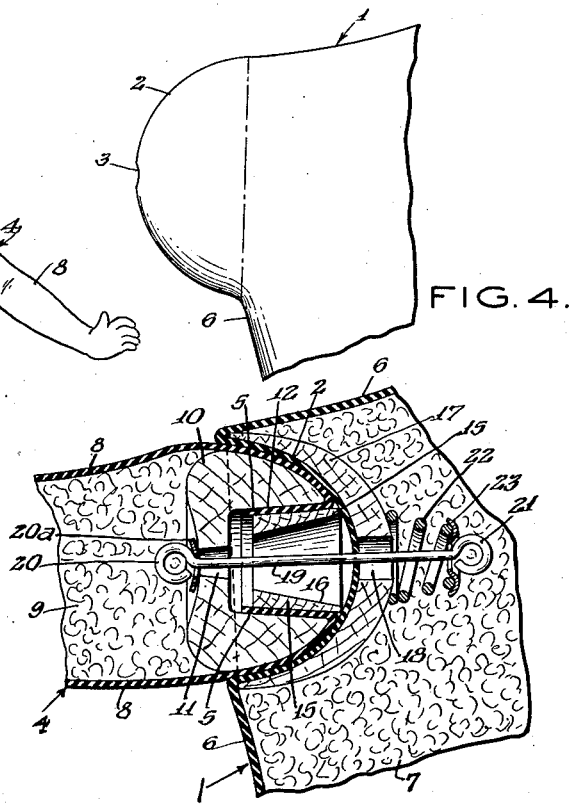
FIG. 4.
FIG. 2.
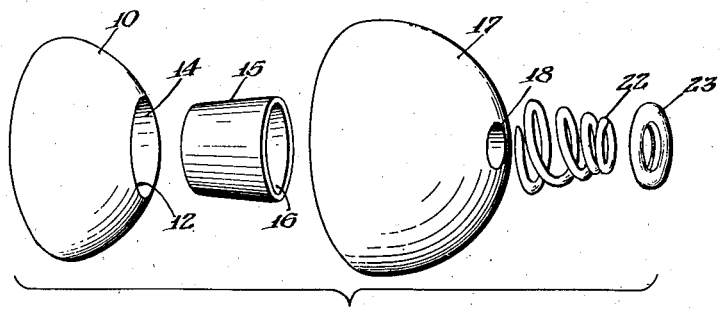
FIG. 3.
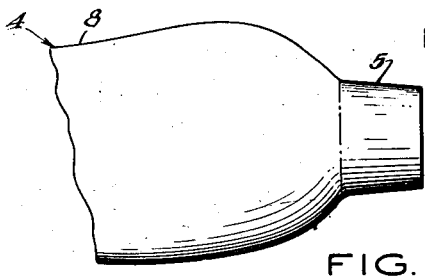
FIG. 5.
INVENTOR.
Abraham M. Katz
BY Mock & Blum
ATTORNEYS Patented Oct. 3, 1944

2,359,425

UNITED STATES PATENT OFFICE 2,359,425

DOLL CONSTRUCTION

Abraham M. Katz, Brooklyn, N. Y., assignor to Ideal Novelty & Toy Co., Long Island City, N. Y., a corporation of New York Application January 8, 1942, Serial No. 426,075

2 Claims. (Cl. 46—173)

My invention relates to a new and improved doll construction.

One of the objects of my invention is to provide an improved joint-construction between the body of a doll and the limb of a doll.

Another object of the invention is to provide an improved joint-construction for dolls which have flexible skins which are made of rubber or other suitable flexible or bendable material, the skins of said dolls having stuffing therein. However, the joint-construction is not limited to any particular type of doll.

Another object of the invention is to provide a joint-construction whereby the limb has universal movement relative to the body, the joint-construction having sufficient friction to retain the limb in its adjusted position.

Other objects of the invention will be stated in the annexed description and drawing.

Fig. 1 is an elevation of the improved doll.

Fig. 2 is a sectional view on the line 2—2 of Fig. 1.

Fig. 3 is a perspective view showing the essential disassembled parts of the joint.

Fig. 4 is an enlarged partial elevation of the joint portion of the body, prior to the assembly of the body with the limb.

Fig. 5 is an enlarged partial elevation of the joint portion of the limb, prior to the assembly of the limb with the body.

The body 1 of the doll preferably has a flexible skin 6 and a resilient and compressible stuffing 7. The skin 6 can be made of rubber or other suitable flexible material, including any type of fabric. The skin 6 is preferably made of rubber so that it is resilient, and so that said skin has a predetermined normal shape, prior to the stuffing thereof. The stuffing 7 is also preferably soft and resilient so that the body 1 can be readily bent and squeezed and the rubber skin 6 can be pinched and wrinkled.

In the particular embodiment illustrated, the skin of the body is integral with the skin of the legs, and only the arms are connected to the body by the improved joint-construction. However, all the limbs of the doll may be connected to the body by the improved joint-construction.

As shown in Fig. 4, the rubber skin 6 of the body 1 is originally formed with an integral outwardly-extending extension 2 which is provided with an end opening 3. This end opening 3 may be of any shape, either cylindrical or an angular slot or the like. The skin 6 of the body 1 and the extension 2 of said skin are preferably made of dipped and vulcanized latex. Each arm 4 also preferably comprises a flexible skin 8 and a stuffing 9. The skin 8 is also preferably made out of vulcanized latex, by means of the usual dipping process. The skin 8 of the arm 4 is also resilient and freely bendable and it has a predetermined normal shape. The stuffing 9, like the stuffing 7, is also preferably soft and resilient. Hence, the stuffed arm 4 can be twisted and bent and the combined resilience of the skin 8 and of the stuffing 9, return the arm to its predetermined normal shape.

As shown in Fig. 5, the skin 8 of the arm 4 is originally provided with an integral and reduced and outwardly-extending sleeve-like extension 5. Fig. 4 shows the original shape of the respective part of the body, before the original outwardly-extending extension 2 is bent inwardly within the skin into the reentrant position shown in Fig. 2, which illustrates the assembly of the body and arm. Fig. 5 shows the original shape of the extension 5 of the skin 8, before said extension 5 has been bent into the assembled position shown in Fig. 2.

The inner end of the arm 4 is provided with a rigid bearing block 10 which is made of wood or metal or any other suitable material. Said bearing block 10 has a bore 11 at its outer end, namely, at the end of said bearing block 10 which is closest to the hand portion of the arm. The inner end of the bearing block 10 is provided with a recess which has a frusto-conical wall 12. The diameter of the cross-section of said frusto-conical wall decreases towards the outer end of the bearing block, namely, towards the bore 11. The extension 5 of the skin 8 is inwardly folded so as to abut a part of this frusto-conical wall 12. The inwardly folded extension 5 is clamped in position, by means of a hollow clamping block 15, whose outer wall is of frusto-conical shape. The taper of the outer wall of the clamping block 15 is equal to, and in the same direction as, the taper of the wall 12. If desired, the folded extension 5 can be cemented into the position which is shown in Fig. 2, and the clamping block 15 can also be cemented into said position, by cementing it to the adjacent surface of extension 5.

The inwardly-folded extension 2 of the skin 6 abuts a complementary bearing block 17, which has a cup-shaped wall which faces the partial cup-shaped wall of the bearing block 10. The supplemental bearing block 17 is also made of wood or other suitable rigid material, and it is preferably not cemented to the adjacent surface of the extension 2.

The bearing block 10 and the supplemental bearing block 17 are held in assembled position by means of a pin 19 which is made of metal or any other suitable rigid material. One end of the pin 19 is provided with a hook-shaped head 20, and with a bearing washer 20a. The other end of the pin 19 is provided with a hook-shaped end 21. When the pin 19 is initially made, it is provided only with a hook-shaped head 20, and the shank of said pin 19 is straight. When the straight shank of the pin 19 has been inserted into the position shown in Fig. 2, said shank is bent in order to form the head 21, after the bearing washer 23 and the compression spring 22 have been located on said shank. The head 21 is formed so that the spring 22 is maintained under initial compression.

The spring 22 thus resiliently urges the bearing block 10 and the supplemental bearing block 17 towards each other, so that the limb is held movably but firmly in the respective socket of the body 1, which is formed by the inwardly bent extension 2. The cup-shaped adjacent walls of the bearing block 10 and of the supplemental bearing block 17 are of identical spherical shape. The arm 4 can therefore be freely turned around the straight longitudinal axis of the shank of the pin 19, and the spring 22 and the bearing block 10 and the supplemental bearing block 17 produce a frictional holding action, so that the arm 4 is retained in any position in which it is adjusted when said arm is thus turned around the straight longitudinal axis of the pin 19. Fig. 1 illustrates how the left arm of the doll has been turned to an upward position, in which said arm is retained by said frictional force. The arm 4 can thus be turned in any direction, in unison with the bearing block 10, relative to the supplemental bearing block 17, through a substantial arc. The last-mentioned turning movement of the arm is limited by the contact of the shank of the pin 19, with the inner wall 16 of the clamping block 15. This inner wall 16 of the clamping block 15 is made of frustoconical form and this taper of the wall 16 is made sufficiently great so as to permit a substantial turning movement of the bearing block 10 in unison with the arm 4 in any direction, relative to the supplemental bearing block 17. When the arm 4 is thus turned in unison with the bearing block 10, relative to the supplemental bearing block 17, the spring 22 and the friction of the parts of the universal joint, maintain the arm in said adjusted position. The arm 4 can thus be turned around the axis of the shank of the pin 19 and also around a second axis which is perpendicular to the first-mentioned axis.

The body 1 and the integral outwardly-extending extensions 2 can be made very easily by dipping a form of corresponding shape into latex or into any suitable solution or dispersion of rubber or like material. After the latex or the solution or dispersion has dried, a body skin is formed which has the integral extensions 2. After this skin has been vulcanized or otherwise set, so that it is elastic and said skin also has a predetermined normal shape, said skin can be easily stripped from the mold. The mold can be made in sections, in order to facilitate such stripping. The stripped skin is preferably very thin so that it will not maintain its predetermined normal shape under ordinary handling without the support of the resilient stuffing 7. The skin 8 of each limb-member 4, and the integral extension 5 of each said skin 8, can also be made by a dipping process. As initially made, each extension 2 therefore extends outwardly relative to the skin 1, and each extension 5 extends outwardly relative to the respective skin 8.

While the invention is not limited to the use of a rubber skin, or to the use of a dipping mold for forming the rubber parts of the doll, the above-mentioned shapes greatly facilitate the manufacture of such parts by a dipping operation.

The body 1 and each arm 4 respectively constitute a doll-member which has a flexible and elastic skin, said skin having an outward extension at a joint-portion of said member and of said skin, said outward extension being hollow and being foldable inwardly into said skin.

I have described a preferred embodiment of my invention, but it is clear that numerous changes and omissions can be made without departing from its spirit.

The parts of the joint can be assembled before the stuffing is inserted into the doll. The invention is not limited to a stuffed doll, because the flexible skins can be made sufficiently thick to maintain them in predetermined normal shape. However, the combination of a thin skin and stuffing is preferred, because it facilitates the inward folding of the extensions 2 and 5. Since the invention also applies to a stuffed fabric doll, the skin may be flexible, without being elastic or resilient. The resilience is then provided substantially wholly by the stuffing.

I claim:
1. A joint-construction for the body and limb of a doll, said body and said limb having respective flexible skins, a limb bearing-block located in said limb, a body bearing-block located in said body, said bearing-blocks having bearing-walls which face each other, said bearing-wall of the body bearing-block being concave, said bearing-wall of the limb bearing-block being convex, portions of said skins being located between said bearing-walls, the limb bearing-block extending at least partially into said body, holding means holding said limb bearing-block to the limb so that said limb and said limb bearing-block move in unison, said bearing-blocks having alined bores, a holding pin having a shank which extends through said bores, said pin having a first head which is located in said limb and having a second head which is located in said body, a compression spring mounted on said shank and located between said body bearing-block and said second head, the ends of said spring respectively abutting said body bearing-block and said second head, said bearing surfaces being shaped so that said limb and said limb bearing-block are movable in unison in all directions relative to said skin of the body and said body bearing-block, said limb bearing-block having a recess, part of the skin of the limb being perforated and being located in said recess and being connected to the wall of said recess, said shank extending through said recess and through said skin of the limb.

2. In combination, a recessed doll member comprising a flexible skin having an extension folded inwardly into a recessed joint portion of the member, a second member having a portion received within the recess of the first member, and connecting means for the members, said second member also having a skin with an extension folded inwardly to a position opposite the skin extension of the first member.

ABRAHAM M. KATZ.